United States Patent [19]

Tatara et al.

[11] Patent Number: 4,898,567
[45] Date of Patent: Feb. 6, 1990

[54] PULLEYS FOR BELT-AND-PULLEY TYPE CONTINUOUSLY VARIABLE TRANSMISSION

[75] Inventors: Yudai Tatara, Susono; Kiyoomi Sato, Toyota; Susumu Okawa, Aichi-ken; Yasunobu Jufuku, Gotenba, all of Japan

[73] Assignee: Toyota Jidosha Kabushiki Kaisha, Japan

[21] Appl. No.: 261,319

[22] Filed: Oct. 24, 1988

[30] Foreign Application Priority Data

Oct. 26, 1987 [JP] Japan ............................... 62-268059
Sep. 13, 1988 [JP] Japan ............................... 63-229187

[51] Int. Cl.$^4$ ............................................. F16G 1/22
[52] U.S. Cl. ........................................ 474/174; 471/201
[58] Field of Search .......................... 474/166, 174–177, 474/187–189, 201, 237, 272, 242–245

[56] References Cited

U.S. PATENT DOCUMENTS

| 902,224 | 10/1908 | Fouillaron | 474/201 |
| 1,601,662 | 9/1926 | Abbott | 474/201 X |
| 1,966,831 | 7/1934 | Oakes et al. | 474/201 X |
| 4,622,025 | 11/1986 | Kern et al. | 474/245 |

FOREIGN PATENT DOCUMENTS

| 1500328 | 7/1969 | Fed. Rep. of Germany | 474/201 |
| 50-113665 | 5/1975 | Japan . | |
| 59-29862 | 2/1984 | Japan . | |

Primary Examiner—Thuy M. Bui
Attorney, Agent, or Firm—Oliff & Berridge

[57] ABSTRACT

A pair of pulleys for a belt-and-pulley type continuously variable transmission wherein the pulleys are connected by a transmission belt such that the belt is partially in contact with contact surfaces of the pulleys. At least one of the pair of pulleys has a contact surface which has a plurality of raised and recessed portions that are spaced apart from each other at irregular angular intervals in a circumferential direction of the pulley.

13 Claims, 9 Drawing Sheets

▓▓▓ RIDGES
☐ GROOVES

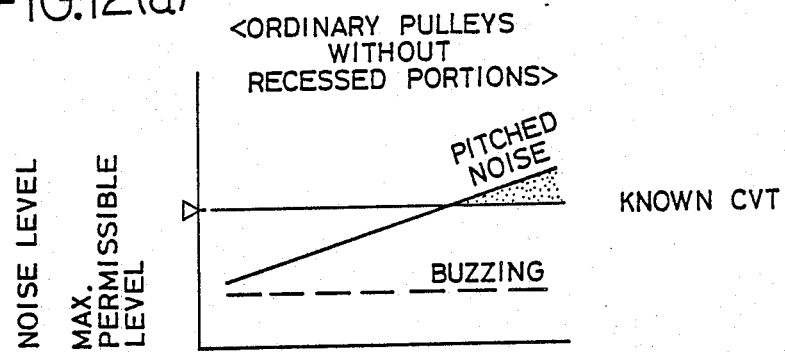
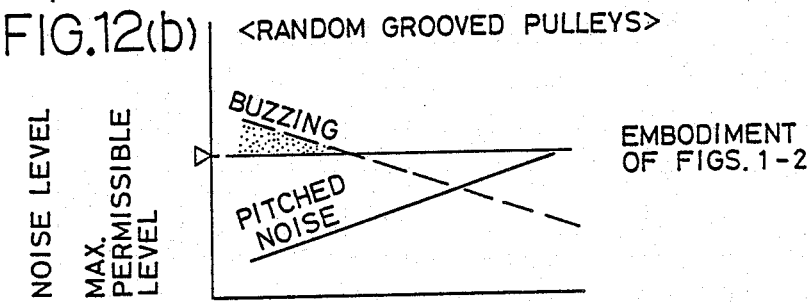
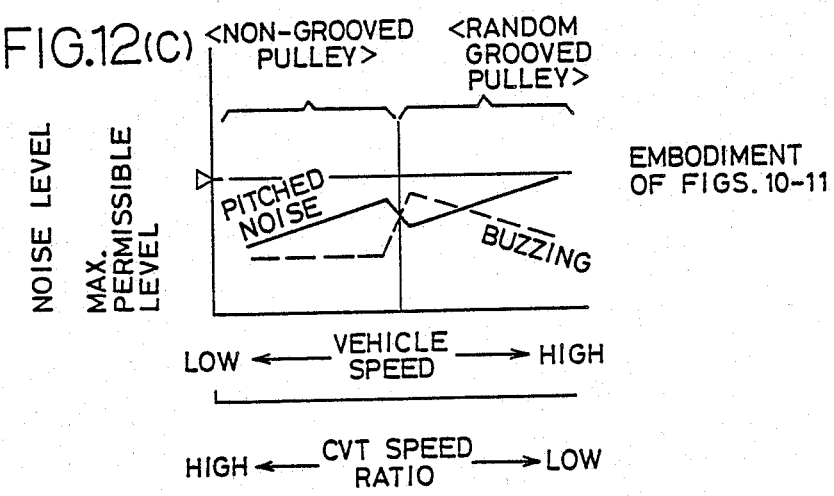

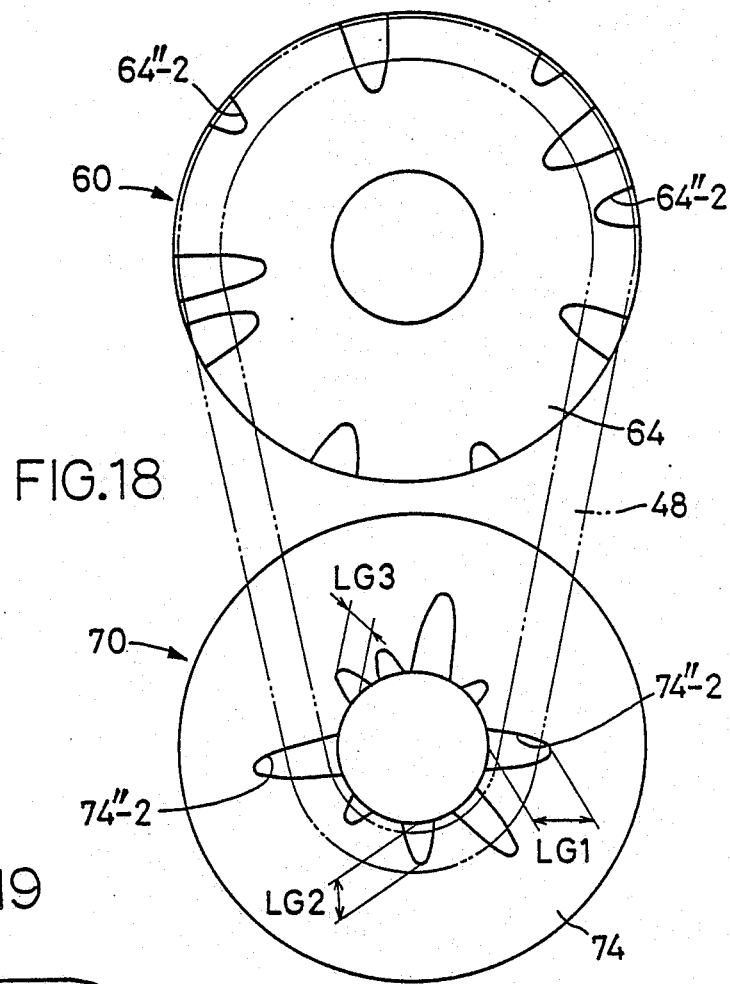
FIG.18
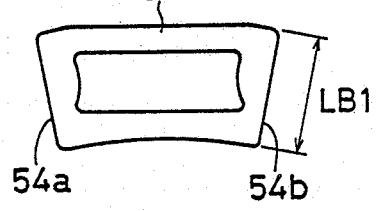
FIG.19
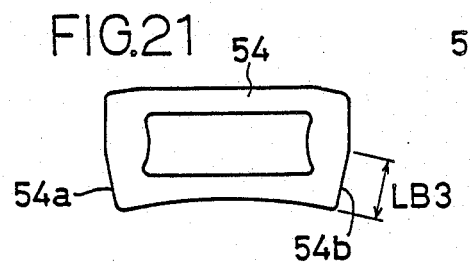
FIG.20
FIG.21

PULLEYS FOR BELT-AND-PULLEY TYPE CONTINUOUSLY VARIABLE TRANSMISSION

BACKGROUND OF THE INVENTION

1. Field of the Invention

The present invention relates to improvements associated with a pair of pulleys used in a belt-and-pulley type continuously variable transmission.

2. Discussion of the Prior Art

As a continuously variable transmission, there is known a belt-and-pulley type continuously variable transmission which uses a pair of variable-diameter pulleys, which are connected by a transmission belt so that power is transmitted from one of the pulleys to the other. In a continuously variable transmission of this belt-and-pulley type, the effective diameters of the driving and driven pulleys are changed in the opposite directions, so that the speed ratio of the transmission is changed. Namely, the effective diameter of the driving pulley increases as that of the driven pulley decreases. Where the continuously variable transmission is used for motor vehicle, the transmission is required to have a high degree of durability. To this end, the transmission belt uses a multiplicity of V-blocks or other connecting members that are made of a relatively hard material such as metals and ceramics. The connecting members are disposed along the loop of the belt at a predetermined pitch or spacing. An example of this type of transmission belt is disclosed in U. S. Pat. No. 4,622,025.

Where the transmission belt employing the multiple V-blocks or other connecting members indicated above is used, the connecting members come into abutting contact with the contact surfaces of the driving and driven pulleys, at a relatively high speed, whereby the transmission tends to produce a comparatively high level of noises whose frequency increases wit the running speed of the vehicle, namely, with the rotating speed of the transmission belt, which determines the frequency at which the connecting members of the belt abut on the surfaces of the pulleys. Since the noise is associated with the spacing pitch of the connecting members, this noise will be referred to as "pitched" noise.

SUMMARY OF THE INVENTION

It is accordingly an object of the present invention to provide a pair of pulleys for a belt-and-pulley type continuously variable transmission, which are adapted to operate with a reduced amount of pitched noise, even when the transmission uses a belt having multiple V-blocks or similar connecting members that are spaced apart from each other at a predetermined pitch along the loop of the belt.

The above object may be achieved according to the principle of the present invention, which provides a pair of pulleys for a belt-and-pulley type continuously variable transmission wherein the pulleys are connected by a transmission belt such that the belt is partially in contact with contact surfaces of the pulleys, the pair of pulleys are characterized in that at least one of the pulleys has a contact surface which has a plurality of raised and recessed portions that are spaced apart from each other at irregular angular intervals in a circumferential direction of the relevant pulley.

The belt-and-pulley transmission using the pulleys constructed according to the present invention described above generates a reduced amount of pitched noise, even where the transmission uses a belt which includes V-blocks or other connecting members which engage the pulleys in abutting contact with the contact surfaces of the pulleys. Described more specifically, the plurality of raised and recessed portions formed on the contact surface or surfaces of the pulley or pulleys cause random changes in the circumferential position of the pulley or pulleys at which the connecting members of the belt contact the relevant contact surface or surfaces. That is, the points of contact between the connecting members of the belt and the contact surface or surfaces of the pulley or pulleys differ from time to time, whereby the pitched noise due to the contact of the belt with the pulleys may be significantly reduced owing to the irregularities of the raised and recessed portions formed on the contact surface or surfaces of the pulley or pulleys.

The plurality of raised and recessed portions may consist of a plurality of raised portions and a plurality of recessed portions which are disposed between the adjacent raised portions.

The pair of pulleys may consist of a driving pulley having a fixed rotor with a first contact surface and an axially movable rotor with a second contact surface, and a driven pulley having a fixed rotor with a third contact surface and an axially movable rotor with a fourth contact surface. In this case, at least one of the first, second, third and fourth contact has the plurality of raised and recessed portions. Preferably, each of the first, second, third and fourth contact surfaces has the plurality of raised and recessed portions. In another preferred form of the invention, at least one of the first and second contact surfaces of the driving pulley has the plurality of raised and recessed portions formed in a radially outer circumferential portion thereof, while at least one of the third and fourth contact surfaces of the driven pulley has the plurality of raised and recessed portions formed in a radially inner circumferential portion thereof. This arrangement is advantageous in reducing roaring or buzzing noise which tends to be produced during rotation of the belt at a relatively low speed, due to vibrations of the straight portions of the loop of the belt, which may be generated due to the presence of the raised and recessed portions of the contact surface or surfaces of the pulley or pulleys.

According to another feature of the invention, the plurality of raised and recessed portions are defined by a plurality of radial ridges and/or recesses which extend substantially in a radial direction of the at least one pulley. In this case, the plurality of radial ridges and/or recesses may have different circumferential widths and/or radial lengths, which are determined at random. Where the radial ridges and/or recesses have different radial lengths, the freedom of design of the pattern of the raised and recessed portions of the contact surface is increased for effective reduction of the pitched and buzzing noises of the transmission.

According to a further feature of the invention, the plurality of raised and recessed portions consist of a plurality of spiral ridges and grooves which have different circumferential widths that are determined at random.

Where the plurality of raised and recessed portions are defined by a plurality of recesses, it is preferable that the above-indicated at least one pulley comprise means for defining bottoms of the plurality of recesses such that a depth of each recess is adjustable or variable. In this case, the depth of each recess is adjusted depending upon the rotating speed of the belt (rotating speed of an engine when the engine is connected to the transmission), such that the depth decreases with an increase in the rotating speed of the belt, so that the buzzing noise or sound due to the vibrations of the belt may be minimized. For example, the means for defining the bottoms of the plurality of recesses comprises a piston slidably received in a fixed rotor or a movable rotor of the above-indicated at least one pulley, such that one end of the piston is exposed to the contact surface of the relevant fixed or movable rotor. Such a piston may be used for changing the height of each of the radial ridges which are formed on the contact surface of the fixed or movable rotor. Preferably, such means for adjusting the depth or height of the radial recesses or ridges is provided on the fixed rotor of the relevant pulley.

BRIEF DESCRIPTION OF THE DRAWINGS

The above and other objects, features and advantages of the present invention will be better understood by reading the following detailed description of presently preferred embodiments of the invention, when considered in conjunction with the accompanying drawings, in which:

FIG. 12(a) is a graph illustrating the levels of pitched noise and buzzing in a transmission using known pulleys;

FIG. 12(b) is a graph illustrating the levels of pitched noise and buzzing in the transmission using the pulleys according to the first embodiment of the invention;

FIG. 12(c) is a graph illustrating the levels of pitched noise and buzzing in the transmission using the pulleys according to the second embodiment of FIG. 10;

FIGS. 17 and 18 are views corresponding to those of FIGS. 10 and 11, showing yet further embodiments of the invention;

FIGS. 19–21 are views illustrating V-blocks of transmission belts used for the pulleys of FIGS. 16 and 18;

DETAILED DESCRIPTION OF THE PREFERRED EMBODIMENTS

Figure 1:
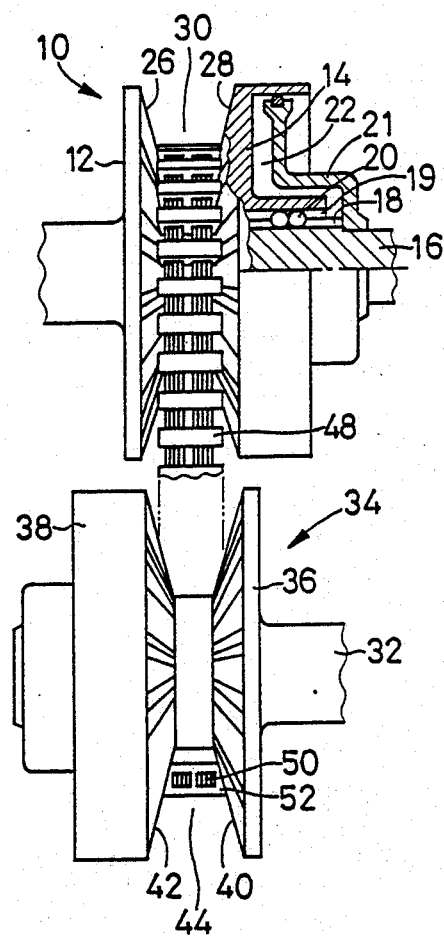
FIG. 1 is a front elevational view partly in cross section of a belt-and-pulley type continuously variable transmission which uses one embodiment of a pair of pulleys of the present invention.

Referring first to FIG. 1, there is shown a belt-and-pulley type continuously variable transmission for a motor vehicle. The transmission includes a pair of variable-diameter pulleys, which consists of a driving pulley 10 associated with an input shaft 16 of the transmission, and a driven pulley 34 associated with an output shaft 32 of the transmission. The driving pulley 10 has a fixed rotor 12 secured to the input shaft 16. The driving pulley 10 further has a movable rotor 14 which is axially movably supported on the input shaft 16 such that the rotor 14 is rotated with the input shaft 16. More specifically, the input shaft 16 has a guide groove 18 formed therein, and the movable rotor 14 has a guide groove 19 formed in its inner circumferential surface. Balls 20 are received in the guide grooves 18, 19 so that the movable rotor 14 is moved in its axial direction along the length of the input shaft 16. The input shaft 16 of the transmission is provided with a cylinder plate 21 fixed thereto. The cylinder plate 21 fluid-tightly and slidably engages an outer circumferential portion of the movable rotor 14, whereby a pressure chamber 22 is defined between the cylinder plate and rotor 21, 14. With a hydraulic pressure applied to the pressure chamber 22, the movable rotor 14 is slidably moved on the input shaft 16, thereby changing an effective diameter of the driving pulley 10, that is, an effective width of a V-groove 30 which is defined by a tapered contact surface 26 of the fixed rotor 12, and a tapered contact surface 28 of the movable rotor 14.

The driven pulley 34 has a fixed rotor 36 secured to the output shaft 32. The driven pulley 34 further has a movable rotor 38 which is axially movably supported on the output shaft 32 such that the rotor 38 is rotated with the output shaft 32. To axially slidbly move the movable rotor 38 on the output shaft 32, the driven pulley 34 is also provided with a pressure chamber similar to the pressure chamber 22 of the driving pulley 10. With a hydraulic pressure applied to the pressure chamber of the driven pulley 34, the effectiv diameter of the pulley 34 is changed. Namely, the movable rotor 38 is moved to change the effective width of a V-groove 44 which is defined by a tapered contact surface 40 of the fixed rotor 36, and a tapered contact surface 42 of the movable rotor 38.

The driving and driven pulleys 10, 32 are connected by a transmission belt 48 which engages the V-grooves 30 and 44. For example, the transmission belt 48 includes an endless chain 50, and a multiplicity of V-blocks 52 which are disposed on the chain 50 at a predetermined pitch, i.e., spaced apart from each other by a predetermined distance along the length of the chain 50. A drive force produced by an engine of the vehicle is transmitted to the driving pulley 10 via the input shaft 16, and then to the driven pulley 34 via the belt 48 such that the V-blocks 52 held on the chain 50 are successively brought into pressed contact with the contact surfaces 26, 28, 40, 42 of the pulleys 10, 34. The drive force transmitted to the driven pulley 34 is then transmitted to drive wheels of the vehicle which are operatively connected to the output shaft 32 of the transmission.

In the case where the contact surfaces 26, 28 of the driving pulley 10 and the contact surfaces 40, 42 of the driven pulley 34 are not formed with raised and recessed portions according to the present invention, the continuously variable transmission suffers from a comparatively high level of noises which are generated due to contact of the V-blocks 52 of the transmission belt 48 with the contact surfaces 26, 28, 40, 42 of the pulleys 10, 34. It is recognized that the magnitude of such noises produced by the transmission increases with an increase in the running speed of the vehicle with the speed of the input shaft 16. That is, the noise level is raised with an increase in the rotating speed of the transmission belt 48, which increases with an increase in the engaging diameter of the driving pulley 10, i.e., with a decrease in the speed ratio of the transmission (speed of the input shaft 16/speed of the output shaft 32), provided that the speed of the input shaft 16 or engine speed is constant. As the rotating speed of the transmission belt 48 increases, the V-blocks 52 of the belt 48 abuts on the contact surfaces 26, 28, 40, 42 of the pulleys 10, 32 at an increasing speed. The noises arising from the abutting contact of the V-blocks 52 with the contact surfaces 26, 28, 40, 42 is pitched according to the pitch or spacing of the V-blocks 52, and will be hereinafter referred to as "pitched noise". The frequency and magnitude of the pitched noise increase with the speed of the belt 48 (with the vehicle speed provided the engine speed is constant).

Figure 3:
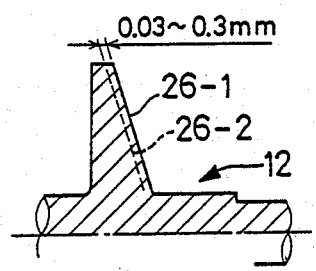
FIG. 3 is an elevational view in cross section of a fixed rotor of the driving pulley of FIG. 2.
Figure 4:
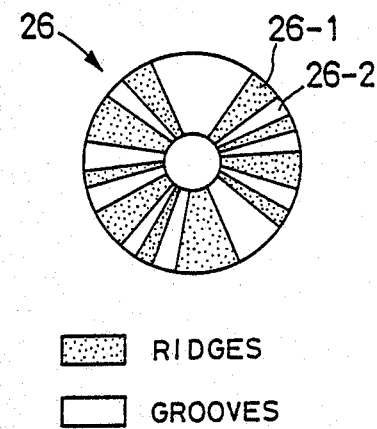
FIG. 4 is an elevational view of the fixed rotor of FIG. 3.
Figure 2A:
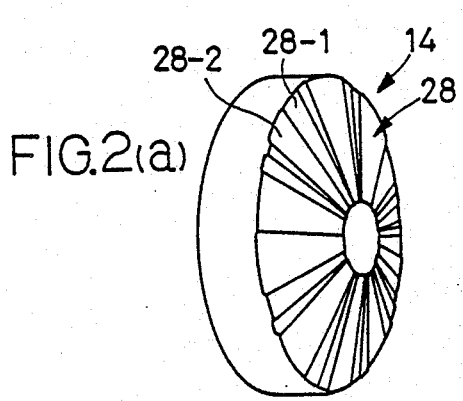
FIG. 2 is a perspective view of the driving pulley of the transmission of FIG. 1.
Figure 2B:
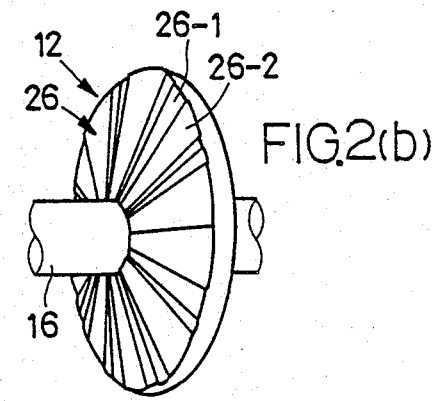

In the present embodiment, however, the contact surfaces 26, 28, 40, 42 of the driving and driven pulleys 10, 12 are formed with raised and recessed portions, in order to reduce or minimize the pitched noise. The raised and recessed portions are provided at irregular angular intervals in the circumferential direction of the pulleys. An example of such raised and recessed portions formed on the driving pulley 10 is illustrated in FIGS. 2-4. The contact surface 26 of the fixed rotor 12 has a plurality of radial ridges 26-1, and a plurality of radial grooves 26-2. The contact surface 28 of the movable rotor 14 has radial ridges 28-1 and radial grooves 28-2, which are formed in the same pattern as that formed on the contact surface 26. The radial ridges 26-1, 28-1, and the radial grooves 26-2, 28-2 are circumferentially spaced apart from each other at irregular angular intervals, such that the radial ridges 26-1, 28-1 are disposed between the appropriate adjacent radial grooves 26-2, 28-2. These radial ridges and grooves 26-1, 28-1, 26-2, 28-2 have different circumferential widths determined at random, as most clearly shown in FIG. 4. The same patterns of radial ridges 26-1, 28-1 and radial grooves 26-2, 28-2 formed on the contact surfaces 26 and 28 of the fixed and movable rotors 12, 14 are positioned with respect to each other such that the ridges and grooves 26-1, 26-2 on the contact surface 26 are opposed to the ridges and grooves 28-1, 28-2 on the contact surface 28, which have the same circumferential widths as those on the contact surface 26. The depths of the radial grooves 26-2, 28-2 relative to the surfaces of the radial ridges 26-2, 28-2 are determined so as to minimize the noises generated by the abutting contact of the transmission belt 48 with the contact surfaces 26, 28, but at the same time so as to prevent reduction in the power transmission function of the pulleys 10 and belt 48. Preferably, the depths of the radial grooves 26-2, 28-2 are selected within a range of 0.03-0.3 mm.

Figure 5:
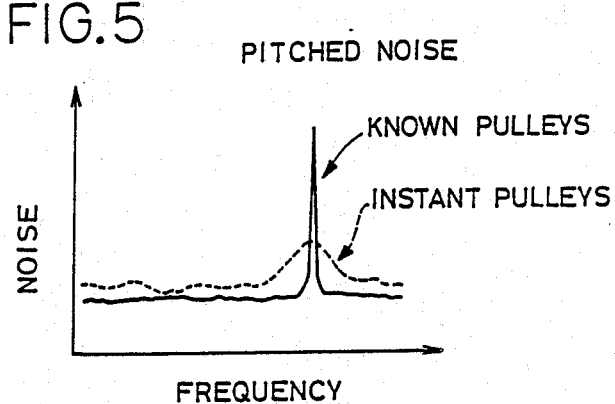
FIG. 5 is a graphical representation of relationships between the level and frequency of pitched noise produced in the transmission of FIG. 1, as compared with that in a transmission using known pulleys.

In the present embodiment wherein the contact surfaces 26, 28 of the driving pulley 10 and the contact surfaces 40, 42 of the driven pulley 34 have the raised and recessed portions which are irregularly spaced apart from each other in the circumferential direction, the circumferential position a which the individual multiple V-blocks 52 of the belt 48 come into abutting contact with the contact surfaces 26, 28, 40, 42 differs from time to time, even though the V-blocks 52 are disposed at a predetermined constant pitch along the loop of the chain 50 of the belt 48. In other words, the frequency at which the V-blocks 52 abut on the contact surfaces 26, 28, 40, 42 of the driving and driven pulleys 10, 34 varies irregularly or at random, depending on the irregularity of the circumferential spacings of the radial ridges and grooves 26-1, 28-1, 26-2, 28-2. As a result, the level of the pitched noise which has a peak at a certain frequency is generally lowered in the pulleys 10, 34 constructed according to the present embodiment of the invention, as compared with that of the pitched noise generated in the known pulleys, as indicated in FIG. 5.

Various modified embodiments of the invention will be described, by reference to FIGS. 6-9 and the following figures. The same reference numerals as used in the preceding embodiment will be used to identify the corresponding components or elements. In the interest of brevity and simplification, redundant description of these corresponding components will not be provided. In FIGS. 6-9, modified patterns of raised and recessed portions formed on the contact surface 26 of the fixed rotor 12 of the driving pulley 10 are illustrated by way of example. The same pattern of raised and recessed portions is formed on the contact surface 28 of the movable rotor 14 of the driving pulley 10, and on the contact surfaces 40, 42 of the driven pulley 34.

Figure 6:
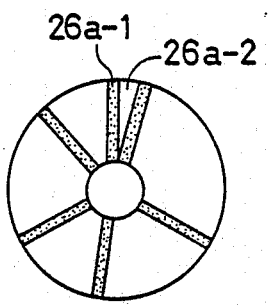
FIGS. 6–9 are elevational views corresponding to that of FIG. 4, showing other embodiments of the invention.
Figure 7:
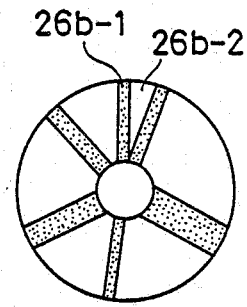
Figure 8:
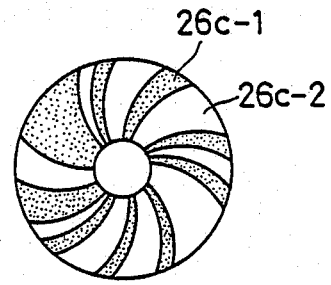
Figure 9:
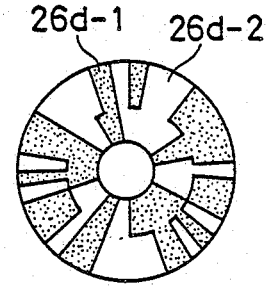

In the modified embodiment of FIG. 6, the raised and recessed portions are provided in the form of radial ridges and grooves 26a-1, 26a-2, which have the same radial length and the same circumferential width, and are spaced apart from each other at irregular circumferential angular intervals. In the embodiment of FIG. 7, radial ridges and grooves 26b-1 and 26b-2 are formed on the contact surface 26, at irregular circumferential intervals, and have different circumferential widths. In the further modified embodiment of FIG. 8, the raised and recessed portions are provided in the form of spiral ridges 26c-1 and spiral grooves 26c-2 which are also irregularly disposed in the circumferential direction and have different circumferential widths when measured at a given radius of the contact surface 26. As indicated in FIG. 8, the circumferential width of each spiral ridge 26c-1 (and spiral groove 26c-2) progressively increases with the radius of the contact surface 26, i.e., increases in the radially outward direction. In the still further embodiment of FIG. 9, the raised and recessed portions formed on the contact surface 26 are provided in the form of raised and recessed parts 26d-1, 26d-2, which are disposed at random or irregularly in various aspects. Described more specifically, the contact surface 26 is divided into a radially inner section and a radially outer section, which have different patterns of raised and recessed areas (26d-1, 26d-2), in terms of circumferential spacing, circumferential width, and configuration. As indicated in the figure, some of the raised and recessed sections 26d-1, 26d-2 have a radial length shorter than the radius of the contact surface 26.

Figure 10:
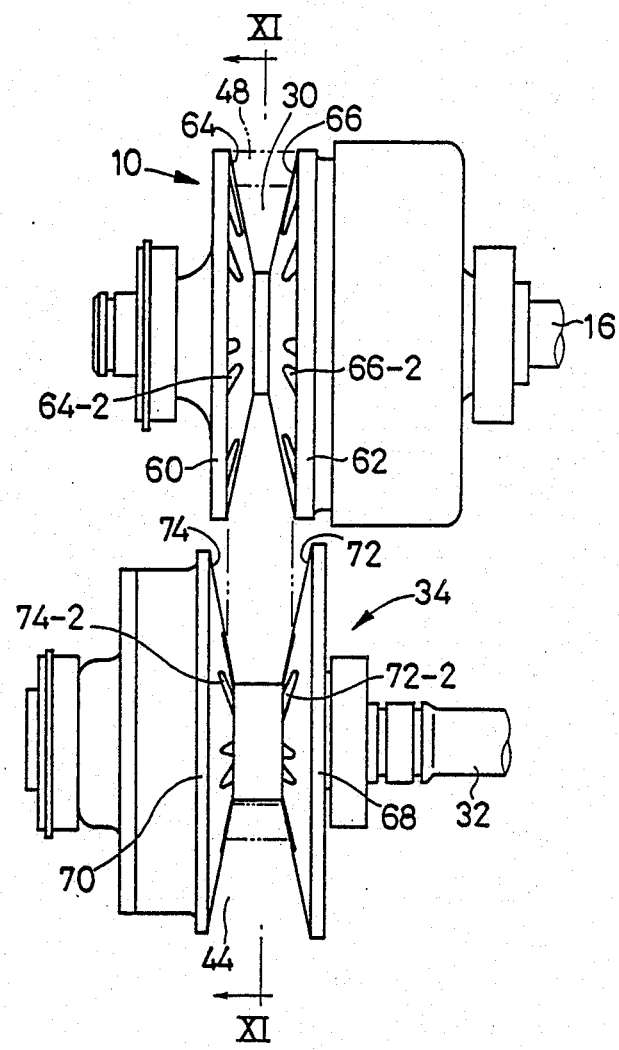
FIG. 10 is an elevational view corresponding to that of FIG. 1, showing a further embodiment of the invention.
Figure 11:
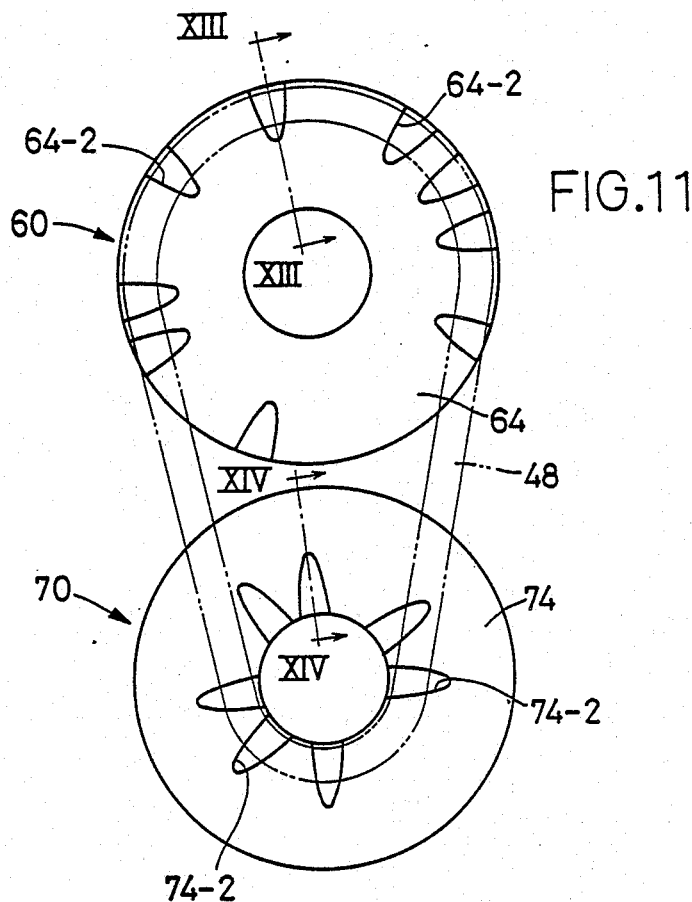
FIG. 11 is a view of contact surfaces of the pulleys of FIG. 10, taken along line XI—XI of FIG. 10.

Referring next to FIGS. 10 and 11, there is shown a belt-and-pulley type continuously variable transmission employing a yet further embodiment of the invention, wherein the driving pulley 10 and the driven pulley 34 have substantially the same construction as those provided in the transmission shown in FIGS. 1 and 2. Namely, the driving pulley 10 includes a fixed rotor 60 secured to the input shaft 16, and a movable rotor 62 axially slidably supported on the input shaft 16 such that the rotor 62 is rotated with the shaft 16. Similarly, the driven pulley 34 includes a fixed rotor 68 secured to the output shaft 32, and a movable rotor 70 axially slidably supported on the output shaft 32 such that the rotor and shaft 70 are rotated together. Radially outer circumferential portions of contact surfaces 64, 66 of the fixed and movable rotors 60, 62 of the driving pulley 10, and radially inner circumferential portions of contact surfaces 72, 74 of the fixed and movable rotors 68, 70 of the driven pulley 34, have raised and recessed portions which have irregular angular or circumferential spacing, in order to minimize the above-indicated pitched noise of the transmission. More specifically, the contact surfaces 64, 66 of the driving pully 10 have radial recesses 64-2, 66-2 formed in their radially outer circumferential portions such that the recesses 64-2 are opposed to the recesses 66-2. Similarly, the contact surfaces 72, 74 of the driven pulley 34 have radial recesses 72-2, 74-2 formed in their radially inner circumferential portions such that the recesses 72-2 and 74-2 are opposed to each other. That is, raised or recessed portions are formed neither in the radially inner circumferential portions of the tapered contact surfaces 64, 66, nor in the radially outer circumferential portions of the tapered contact surfaces 72, 74.

With the provision of the circumferentially irregularly spaced-apart radial grooves 64-2, 66-2 formed in the outer circumferential portions of the contact surfaces 64, 66 of the driving pulley 10 and the circumferentially irregularly spaced-apart radial grooves 72-2, 74-2 formed in the inner circumferential portions of the contact surfaces 72, 74 of the driven pulley 34, the instant embodiment of the pulleys 10, 34 is effective to reduce not only the level of the pitched noise which tends to be easily generated while the speed ratio of the transmission is relatively low (while the vehicle speed is relatively high), but also the level of the roaring or buzzing noise which tends to be easily generated while the transmission speed ratio is relatively high (while the vehicle speed is relatively low). The reduction in the levels of the pitched and buzzing noises according to the present embodiment is illustrated in FIG. 12(c). In a common belt-and-pulley type continuously variable transmission, the level of the pitched noise due to the abutting contact of the V-blocks 50 with the surfaces of the pulleys (10, 34) increases as the vehicle speed increases (with the transmission speed ratio being lowered), as indicated in FIG. 12(a), since the multiple V-blocks 52 disposed along the chain 50 at the predetermined pitch come into abutting contact with the surfaces of the pulleys (10, 34) at an increasing speed as the vehicle speed (rotating speed of the belt 48) increases. In the transmission using the instant pulleys 10, 34 according to the preceding embodiments of FIGS. 1–9, the circumferential position of the abutting contact of the V-blocks 52 with the pulley surfaces varies from time to time, because of the radial and recessed portions formed on the contact surfaces 26, 28, 40, 42 of the pulleys 10, 34, whereby the level of the pitched noise can be reduced as indicated in FIG. 12(b). However, the preceding embodiments of FIGS. 1–9 still suffer more or less from the roaring or buzzing noise, which is presumed to be derived from the vibrations of the transmission belt 48 at the straight portions of its loop between the pulleys 10, 34. Such roaring or buzzing noise tends to be easily produced while the transmission speed ratio is relatively low or the vehicle speed is relatively low, as also indicated in FIG. 12(b).

Figure 13:
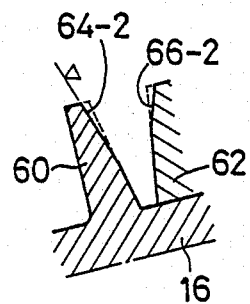
FIGS. 13 and 14 are cross sectional views showing recessed formed in the pulleys of FIG. 10.
Figure 14:
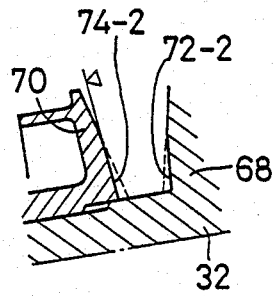

To form the surfaces of the fixed and movable rotors 60, 62 of the driving pulley 10 into the tapered contact surfaces 64, 66, the surfaces of the rotors 60, 62 are held in contact with the surface of a suitable grinding wheel while the rotors 60, 62 are rotated about their axes. Then, the axes of the rotors 60, 62 are inclined by a small angle, and the radial recesses 64-2, 66-2 are formed in the appropriate areas of the outer circumferential portions of the contact surfaces 64, 66, with the grinding wheel in contact with the appropriate areas of the surfaces 64, 66, as the rotors 64, 66 are indexed at the predetermined irregular angular intervals. Similarly, the tapered contact surfaces 72, 74 of the fixed and movable rotors 68, 70 of the driven pulley 34 are formed with the grinding wheel, and the circumferentially irregularly spaced-apart radial recesses 72-2, 74-2 are formed on the tapered contact surfaces 72, 74, by the grinding wheel, by indexing the rotors 68, 70 at irregular angular intervals with their axes slightly inclined. The stocks removed by grinding from the rotors 60, 62, 68, 70, and the radial recesses 64-2, 66-2, 72-2, 74-2 are indicated in broken lines in FIGS. 13 and 14. In the present embodiment, each of the radial recesses 64-2 and 66-2 of the driving pulley 10 has a depth which increases in the radially outward direction and in the circumferential directions toward the circumferential centerline. On the other hand, each of the radial recesses 72-2 and 74-2 has a depth which increases in the radially inward direction and in the circumferential directions toward the circumferential centerline.

Figure 15:
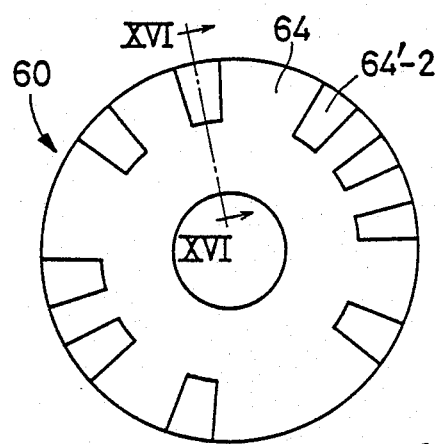
FIG. 15 is a view corresponding to that of FIG. 4, illustrating a still further embodiment of the invention.
Figure 16:
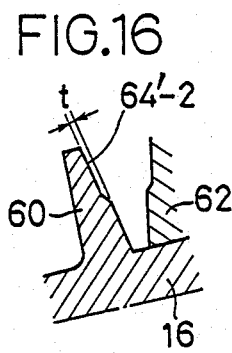
FIG. 16 is a cross sectional view indicating a depth of the recesses of the driving pulley of FIG. 15.

A modification of the radial recess 64-2 in the fixed rotor 60 is indicated at 64'-2 in FIGS. 15 and 16, by way of example. This radial recess 64'-2 has a constant depth "t" which is constant in the radial direction of the rotor 60.

Figure 17:
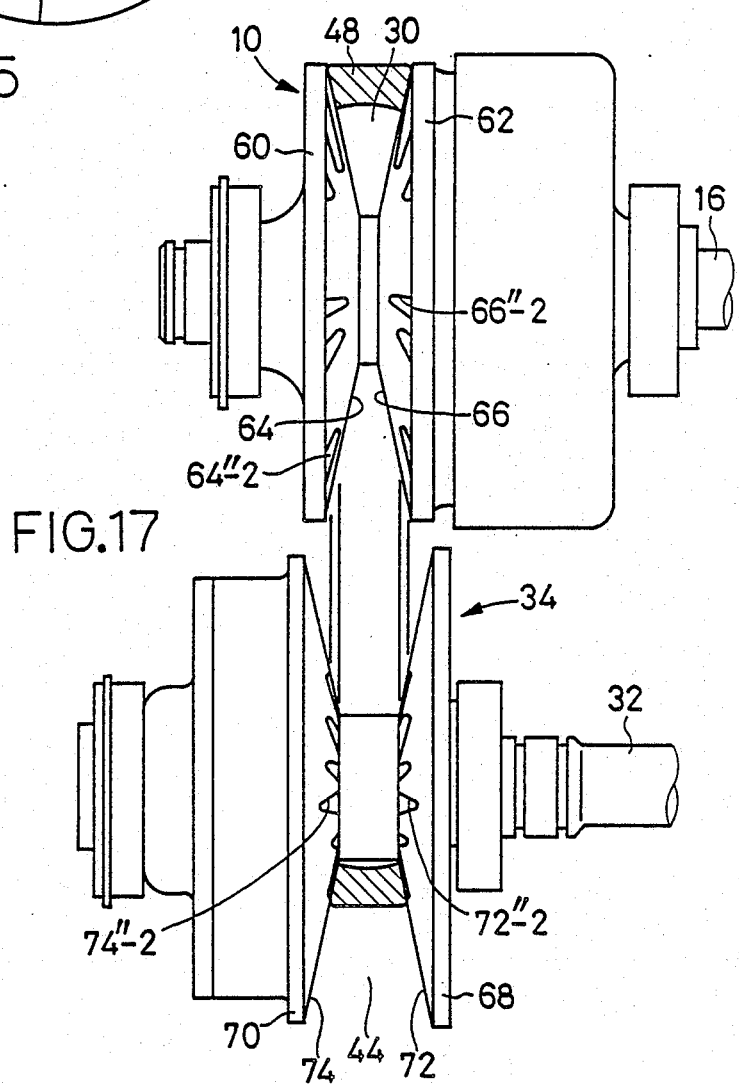

Referring to FIGS. 17 and 18, there is shown a modification of the embodiment of FIGS. 10–11. In this modified embodiment, the contact surfaces 64, 66 of the fixed and movable rotors 60, 62 have radial recesses 64"-2, 66"-2 formed in their radially outward circumferential portions, while the contact surfaces 72, 74 of the fixed and movable rotors 68, 70 have radial recesses 72"-2, 74"-2 formed in their radially inward circumferential portions. These radial recesses 64"-2, 66"-2, 72"-2 and 74"-2 are different from the radial recesses 64-2, 66-2, 72-2, 74-2 in that the recesses 64"-2, 66"-2, 72"-2 and 74"-2 have different radial lengths LG1, LG2, LG3, ... LGn which are determined at random. Further, the dimensions LB1, LB2, LG3, ... LBn of contact surfaces 54a, 54b of the V-blocks 52 of the belt 40 which contact the contact surfaces 64, 66, 72, 74 of the rotors 60, 62, 68, 70 are changed at random, as indicated in FIGS. 19–21, provided that the following inequalities (1) through (n) are satisfied:

$$LG1 > LB1 + \alpha \quad (1)$$
$$LB1 > LG2 > LB2 + \alpha \quad (2)$$
$$LB2 > LG3 > LB3 + \alpha \quad (3)$$
$$\vdots$$
$$LBn-1 > LGn > LBn + \alpha \quad (n)$$

where, $\alpha$: constant

The same advantage as obtained in the preceding embodiment of FIGS. 10 and 11 may be provided in the instant embodiment of FIGS. 17 and 18 wherein the radial recesses 64″-2, 66″-2 are formed in the outer circumferential portions of the contact surfaces 64, 66 of the fixed and movable rotors 60, 62, while the radial recesses 72″-2, 74″-2 are formed in the inner circumferential portions of the contact surfaces 72, 74 of the fixed and movable rotors 68, 70. In addition, the instant embodiment of FIGS. 17–18 has a considerably increased freedom of design of the patterns of the radial recesses 64″-2, 66″-2, 72″-2, 74″-2 on the contact surfaces 64, 66, 72, 74 of the pulleys 10, 34, which patterns may be suitably determined so as to minimize the levels of the pitched and roaring or buzziang noises of the transmission. Further, since the dimensions LB1, LB2, LB3, ... LBn of the contact surfaces 54a, 54b of the V-blocks 54 are determined at random in relation to the radial lengths of the radial recesses 64″-2, 66″-2, 72″-2, 74″-2 so as to satisfy the inequalities (1) through (n) indicated above, the contact surfaces 54a, 54b of some of the V-blocks 54 fully engage the radial recesses 64″-2, 66″-2, 72″-2, 74″-2 of the rotors, while the contact surfaces 54a, 54b of the other V-blocks 54 do not fully engage the radial recesses. In this sense too, the circumferential position of abutting contact between the V-blocks 54 and the pulleys 10, 34 changes at random from time to time, whereby the pitch noise is more effectively reduced.

Figure 22:
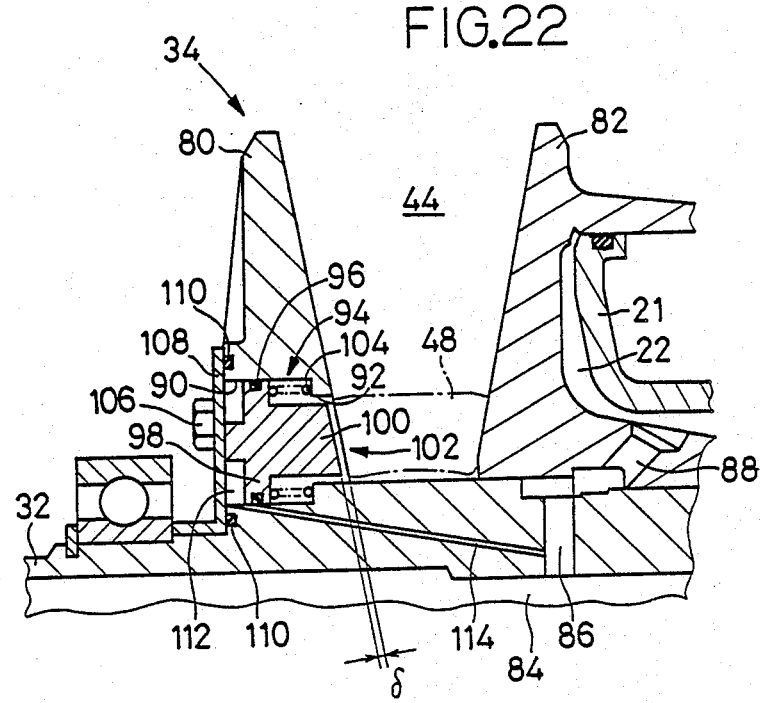
FIG. 22 is a fragmentary view in cross section of another embodiment of the invention.
Figure 23:
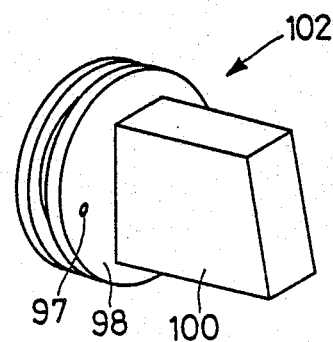
FIG. 23 is a perspective view depicting a piston used in the embodiment of FIG. 22.
Figure 24:
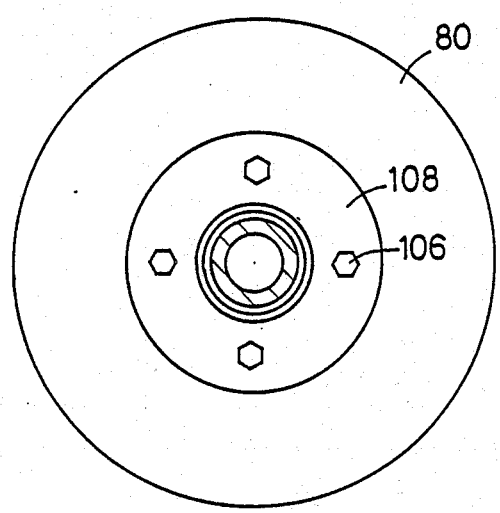
FIG. 24 is a view of a fixed rotor of the driven pulley of FIG. 22, as viewed axially of the rotor from its outside toward its inside.

A still further embodiment of the present invention will be described by reference to FIGS. 22 and 23, wherein the depth of the recessed portions may be adjusted or changed. Since the driving and driven pulleys 10, 34 are identically constructed, only the driven pulley 34 will be described by way of example. In FIG. 22, the driven pulley 34 includes a fixed rotor 80 secured to the output shaft 32, a movable rotor 82 axially slidably supported by the output shaft 32 such that the rotor 82 is rotated with the shaft 32. The pressure chamber 22 provided in the movable rotor 82 is held in communication with an axial fluid passage 84 formed axially through the output shaft 32, through a radial fluid passage 86 formed radially through the output shaft 32, and a fluid passage 88 formed through the movable rotor 82. With the working fluid supplied and discharged to and from the pressure chamber 22 through the passages 84, 86, 88, the movable rotor 82 is axially slidably moved on the output shaft 32, whereby the effective width of the V-groove 44 defined by the fixed and movable rotors 80, 82 may be changed, i.e., the effective diameter of the driven pulley 32 is adjustable.

Figure 25:
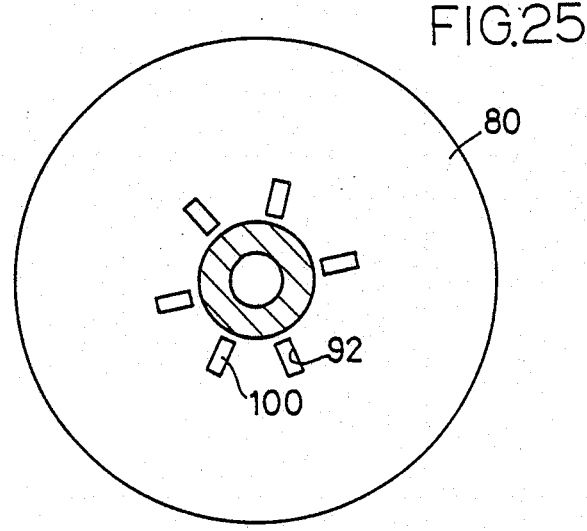
FIG. 25 is a view of the fixed rotor of FIG. 24, as viewed axially of the rotor from its inside toward its outside.

The fixed rotor 80 has a plurality of through holes 94 which are spaced apart from each other in the circumferential direction, at irregular angular intervals. Each through hole 94 consists of a round hole 90 having a circular cross sectional shape, and a rectangular hole 92 having a rectangular cross sectional shape. The rectangular hole 92 extends in the radial direction of the fixed rotor 80. Each through hole 94 accommodates a piston 102 as depicted in the perspective view of FIG. 23, which consists of a disc-like sealing portion 98 and a rectangular engaging nose 100 which extends from one of opposite sides of the disc-like sealing portion 98. The sealing portion 98 has a seal ring 96 fitted in a groove formed in the circumferential surface, and further has a pin hole 97 formed therethrough in the axial direction. A return spring 104 is interposed between the sealing portion 98 of the piston 102, and the shoulder surface of the through hole 94, in order to return the piston 102 to its retracted position. Each of the through holes 94 is closed at its one open end by a circular plate 108 which is attached to the fixed rotor 80 by screws 106. A seal ring 110 is disposed between the fixed rotor 80 and the circular plate 108, as indicted in FIG. 22. Thus, the fixed rotor 80, piston 102 and plate 110 define a fluid-tight fluid chamber 112 which communicates with the above-indicated fluid passage 84 through a fluid passage 114. As indicated in FIG. 25, the rectangular holes 92 of the through holes 94 are open in the contact surface of the fixed rotor 80, such that the openings are spaced apart from each other in the circumferential direction at irregular angular intervals. The free end face of the nose 100 of each piston 102 accommodated in the appropriate through hole 94 defines the bottom of the hole 92, whereby the holes 92 serve as variable-depth recessed portions of the contact surface of the fixed rotor 80. It will be understood that the through holes 94, piston 102 and spring 104 constitute a major part of means for adjusting the depth 6 of the recessed portions in the form of the rectangular holes 92.

While the present invention has been described in its presently preferred embodiments, for illustrative purpose only, it is to be understood that the invention is not limited to the details of the illustrated embodiments, but may be otherwise embodied.

Although the raised and recessed portions 26-1, 28-1, 26-2, 28-2, etc. of the contact surfaces of the rotors of the illustrated pulleys 10, 34 are continuously formed in the radial direction of the rotors, these raised and recessed portions may be discontinuous in the radial direction of the rotors.

In the illustrated embodiments, the circumferentially irregularly spaced-apart raised and recessed portions are formed on the contact surfaces of both of the fixed and movable rotors of both of the driving and driven pulleys 10, 32, only one of the two pulleys 10, 32 may be provided with these raised and recessed portions. Further, only one of the fixed and movable rotors of the driving and/or driven rotor(s) may be provided with the raised and recessed portions. In any of these modified arrangements, the principle of the invention to reduce the pitched noise may be practiced with a significant effect.

While the raised and recessed portions provided in the first embodiment of FIGS. 1 and 2 are defined by the radial ridges 26-1, 28-1 and the radial grooves 26-2, 28-2, it is possible that the raised and recessed portions may be provided only by the raised ridges 26-1, 28-1. In this case, all or some of the radial ridges 26-1, 28-1 may be defined by the noses 100 of the pistons 102 as depicted in FIGS. 22–23. In this instance, the height of the ridges may be adjusted by the pistons 102.

In the first embodiment of FIGS. 1–2, for example, the radial ridges and grooves 26-1, 26-2 on the contact surface 26 of the fixed rotor 12 are circumferentially aligned with the radial ridges and grooves 28-1, 28-2 on the contact surface 28 of the movable rotor 14. However, the locations, widths and lengths of the ridges and grooves 26-1, 26-2, 28-1, 28-2 may be determined at random, without any predetermined positional and/or configuration relation between the ridges and grooves on the contact surface 26 and the ridges and grooves on the contact surface 28.

In the illustrated embodiments, the V-blocks 52 or 52 of the belt 48 are adapted to contact the contact surfaces of the pulleys 10, 34. However, the belt 48 may be modified such that link plates of the belt 48 or pins conencting the link plates, as well as or rather than the V-blocks 52, 54, successively contact the contact surfaces of the pulleys 10, 34.

In the embodiment of FIGS. 22–25, the fluid chamber 112 for actuating the piston 102 is connected to the fluid passage 84 which is provided for moving the movable rotor 82. However, the fluid chamber 112 may be connected to a suitable control valve which is connected to the fluid passage 84, so that the position of the pistion 102 may be adjusted by the control valve. In this case, the depth of the recessed portion (92) may be controlled independently of the position of the movable rotor 82.

It will be understood that the present invention may be embodied with various other changes, modifications and improvements, which may occur to those skilled in the art, without departing from the spirit and scope of the invention defined in the following claims.

What is claimed is:

1. A pair of pulleys for a belt-and-pulley type continuously variable transmission wherein the pulleys are connected by a transmission belt having multiplicity of contact members such that the contact members of the belt are in contact with contact surfaces of the pulleys, wherein an improvement comprises:
at least one of said pair of pulleys has a contact surface which has a plurality of raised and recessed portions that are spaced apart from each other at irregular angular intervals in a circumferential direction of said at least one pulley such that said contact members of said belt abut on said contact surface of said at least one pulley at varying circumferential positions of said contact surface, so that a pitched noise due to abutting contact between said contact members and said contact surface is reduced.

2. A pair of pulleys according to claim 1, wherein said plurality of raised and recessed portions consists of a plurality of raised portions and a plurality of recessed portions which are disposed between the adjacent raised portions.

3. A pair of pulleys according to claim 1, which consist of a driving pulley having a fixed rotor with a first contact surface and an axially movable rotor with a second contact surface, and a driven pulley having a fixed rotor with a third contact surface and an axially movable rotor with a fourth contact surface.

4. A pair of pulleys according to claim 3, wherein at least one of said first, second, third and fourth contact surfaces has said plurality of raised and recessed portions.

5. A pair of pulleys according to claim 4, wherein each of said first, second, third and fourth contact surfaces has said plurality of raised and recessed portions.

6. A pair of pulleys according to claim 3, wherein at least one of said first and second contact surfaces of said driving pulley as said plurality of raised and recessed portions formed in a radially outer circumferential portion thereof, while at least one of said third and fourth contact surfaces of said driven pulley has said plurality of raised and recessed portions formed in a radially inner circumferential portion thereof.

7. A pair of pulleys according to claim 1, wherein said plurality of raised and recessed portions are defined by a plurality of radial ridges and/or recesses which extend substantially in a radial direction of said at least one pulley.

8. A pair of pulleys according to claim 7, wherein said plurality of radial ridges and/or recesses have different circumferential widths which are determined at random.

9. A pair of pulleys according to claim 7, wherein said plurality of radial ridges and/or recesses have different radial lengths which are determined at random.

10. A pair of pulleys according to claim 7, wherein said plurality of raised and recessed portions consist of a plurality of spiral ridges and grooves which have different circumferential widths that are determined at random.

11. A pair of pulleys according to claim 1, wherein said plurality of raised and recessed portions are defined by a plurality of recesses, said at least one pulley comprising means for defining bottoms of said plurality of recesses such that a depth of each of said recesses is variable.

12. A pair of pulleys according to claim 11, each of which consists of a fixed rotor and an axially movable rotor, said means for defining said bottoms of said plurality of recesses comprises a piston slidably received in one of said fixed and movable rotors such that one end of said piston is exposed to a surface of said one of the fixed and movable rotors which a part of said contact surface of said at least one pulley.

13. A pair of pulleys according to claim 1, wherein said plurality of raised and recessed portions are defined by a plurality of ridges, said at least one pulley comprising means for defining a height of each of said plurality of ridges such that said height is variable.

* * * * *